INVENTORS
KARL E. BAHR
CHARLES R. YOUNG
BY AUGUSTUS W. GRISWOLD

ATTORNEYS

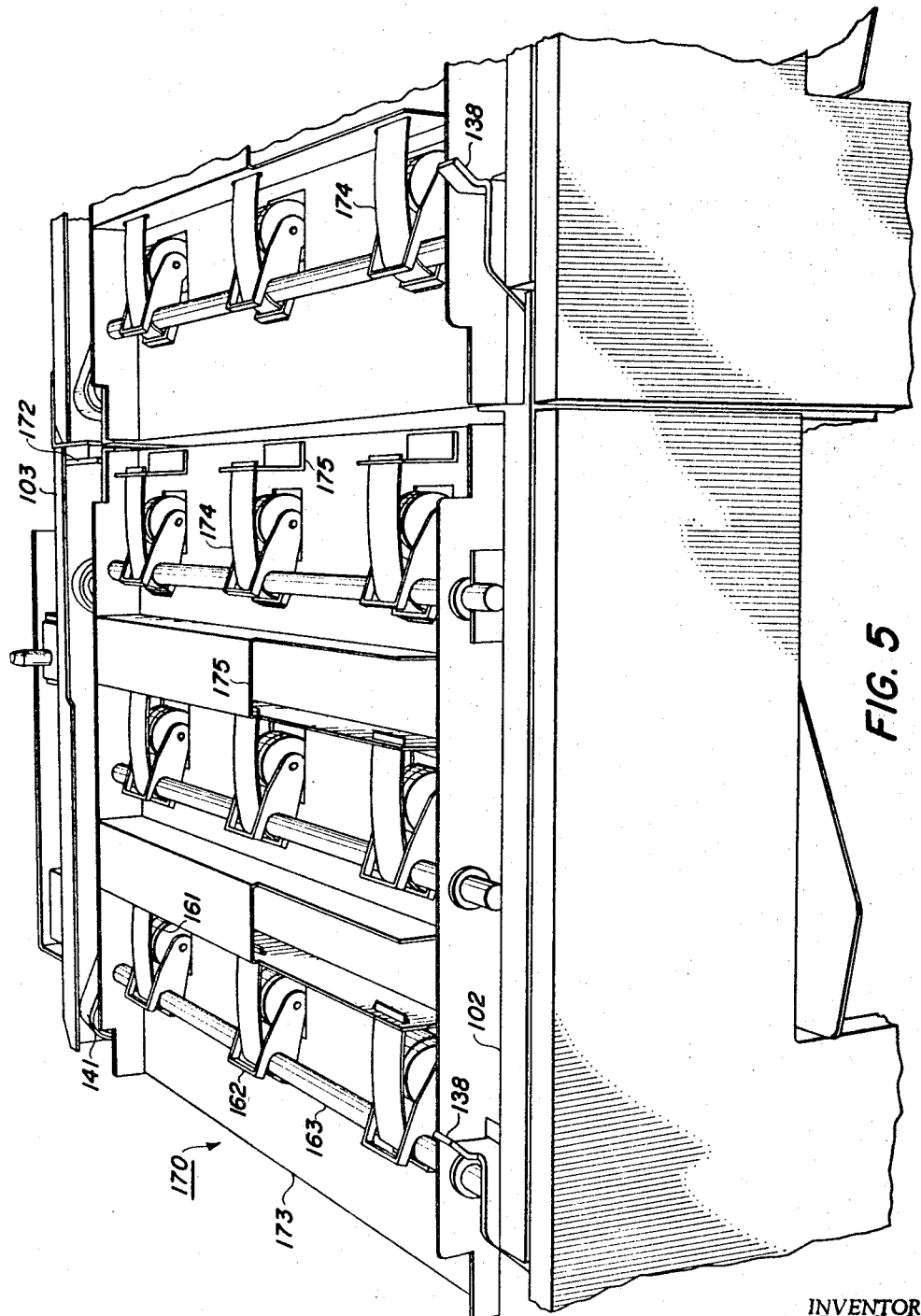

United States Patent Office

3,411,771
Patented Nov. 19, 1968

3,411,771
SHEET TRANSPORT
Karl E. Bahr, Pittsford, and Augustus W. Griswold and Charles R. Young, Rochester, N.Y., assignors to Xerox Corporation, Rochester, N.Y., a corporation of New York
Filed Aug. 26, 1966, Ser. No. 575,477
3 Claims. (Cl. 271—51)

ABSTRACT OF THE DISCLOSURE

A sheet transport mechanism adapted to facilitate the removal of sheet material jams occurring therein. The mechanism includes a plurality of rotatable drive rollers positioned on a support member on one side of the sheet feed path. Positioned on the other side of the sheet feed path is a plurality of idler rollers mounted on a frame member through spring urged bifurcated brackets. The springs are arranged to permit the easy removal and replacement of the idler rollers while the frame and support members are pivotally connected to each other for their separation in the event of a paper jam.

---

This invention relates to paper handling apparatus and, in particular to apparatus adapted to transport sheet material fed thereto.

More specifically, this invention relates to a paper transport adapted to facilitate the replacement of components and the removal of paper jams occurring during the movement of sheet material through the transport.

In prior art transport mechanisms, especially those of the type wherein idler rollers are held in pressure contact with drive rollers, in the event that it was necessary to replace an idler roller the transport had to be dismantled and the roller mechanism to be replaced, removed from the transport necessitating a substantial amount of downtime for the mechanism in which the transport is utilized. In addition, if a paper jam or a machine malfunction occurred resulting in a sheet of paper being stopped in the transport system, removal of such sheet material was extremely difficult due to limited access to the sheet material through the transport mechanism and the destruction of the sheet material for its intended use by the creasing and tearing of the sheet material incurred in removal from the pressure contact of the idler and drive rollers.

The invention of this application provides a paper transport having readily replaceable idler rollers held in pressure contact with drive rollers of the transport and adapted to be easily removed for replacement thereof, and to be unitarily separated from the drive rollers to facilitate the removal of sheet material jams in the transport mechanisms.

Therefore, it is an object of this invention to improve transport mechanisms.

It is another object of this invention to improve paper transport mechanisms by facilitating the replacement of components in the transport mechanism with a minimum of time delay.

It is a further object of this invention to improve paper transport mechanisms by adapting the mechanism to facilitate easy removal of the material being transported therein without the destruction thereof.

These and other objects are obtained in accordance with the present invention wherein there is provided a sheet transporting mechanism including a plurality of idler rollers constructed for ease of removal and replacement in the transport mechanism, and adapted to be moved as a unit out from contact with drive rollers to facilitate the removal of sheet material therebetween.

Further objects of this invention, together with additional features contributing thereto and advantages accruing therefrom, will be apparent from the following description of an embodiment of the invention when read in conjunction with the accompanying drawings, wherein:

FIG. 5 is a front perspective view of a portion of the transport system to illustrate the features thereof.

Figure 1:
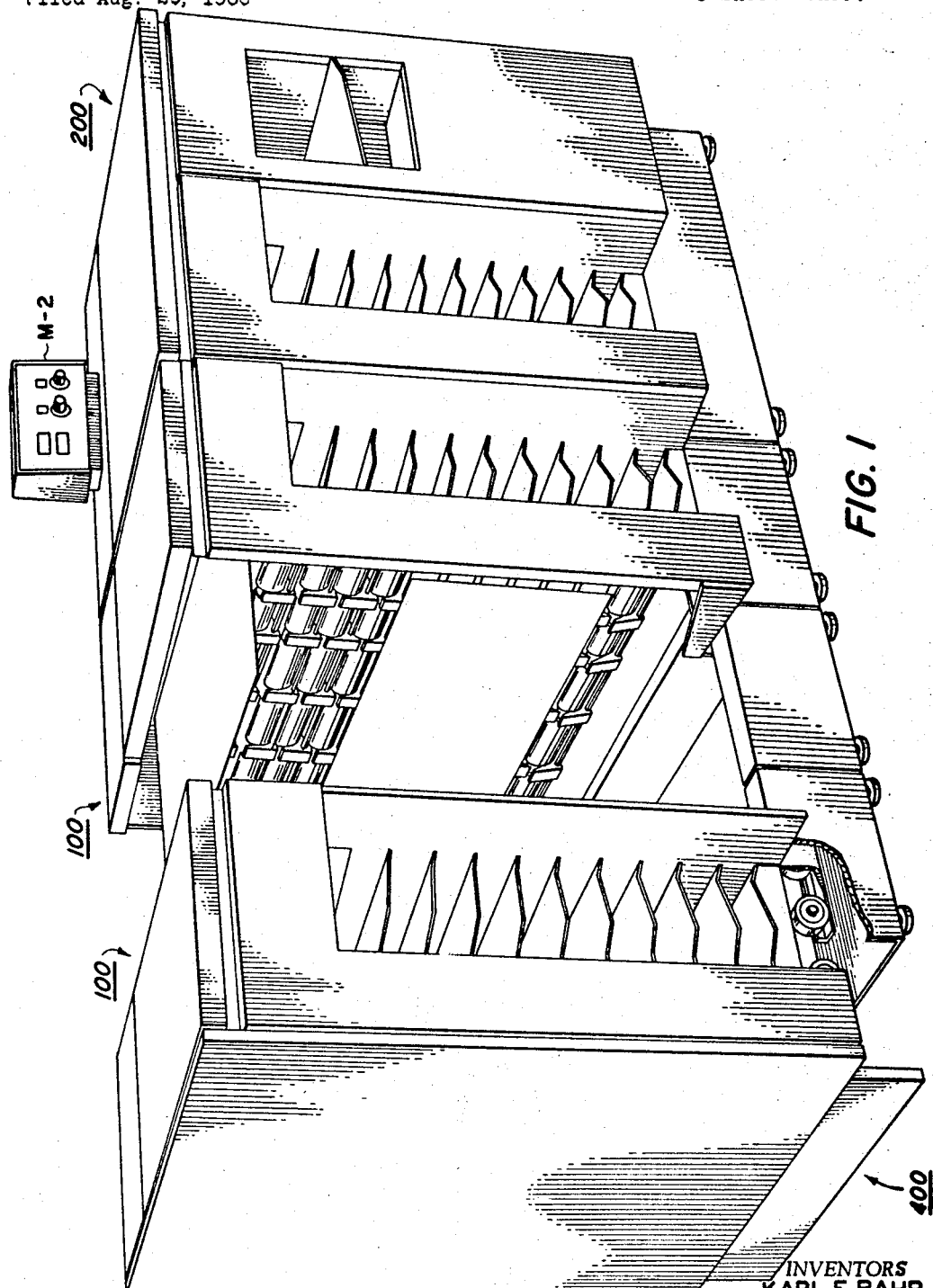
FIG. 1 is a front perspective view of a sheet distributing machine utilizing the invention of this application.

Referring now to the drawings, there is shown an embodiment of the transport mechanism 170 being utilized in a modular sheet distributor of the type disclosed in copending application Ser. No. 575,476, filed Aug. 26, 1966 in the names of Karl E. Bahr et al., and reference is made thereto for the disclosure contained therein. Although the transport mechanism of this application has general utility, for convenience of illustration it will be described with reference to its use in a modular sheet distributor. However, the invention of this application is not intended to be limited thereto.

As shown in the drawings, there is an embodiment of the subject invention being utilized in a modular sheet distributor 100 which includes a plurality of catch trays 110 secured in spaced relation to each other between front and rear frame plates 102 and 103, respectively. Sheet material is distributed to the catch trays by means of a plurality of drive feed rolls 121 secured in spaced relation between front and rear frame plates 102 and 103, respectively, and secured thereto by means of adjustable U-shaped brackets securing the roller shafts 123 in slots provided in the front and rear frame plates. Each drive roller is journaled for rotation upon the stationary shafts 123 and provided with an undercut surface portion in cooperative relationship with gates 131 of the diverting mechanisms 130 which divert sheet material into the proper catch tray in a predetermined sequential order.

Figure 3:
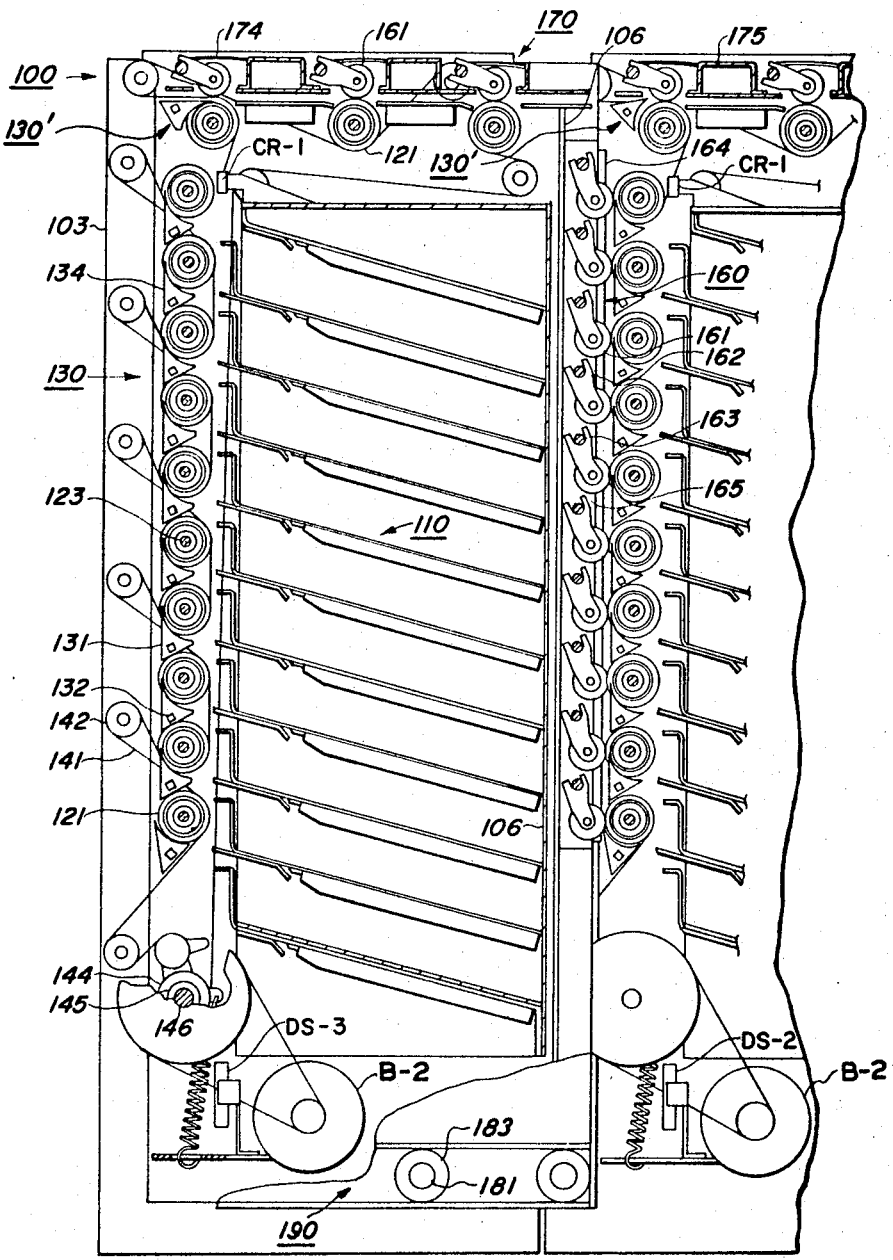
FIG. 3 is a front elevation section of the transport mechanism being utilized in a sheet distributing machine.
Figure 4:
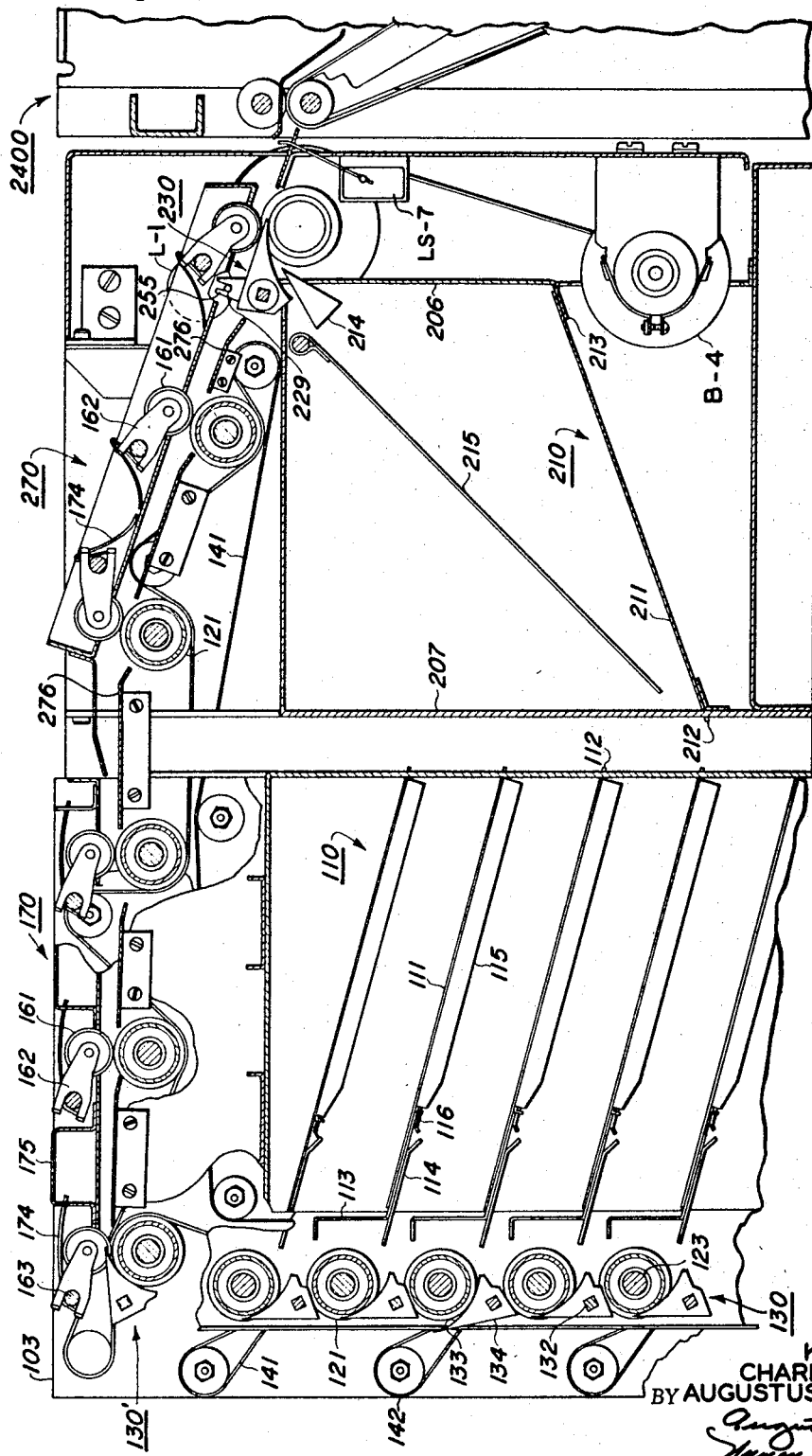
FIG. 4 is an enlarged section of the transport mechanism.

The sheet material is forwarded to the copy catch trays by means of the drive feed rollers 121 driven through a flexible drive belt 141 contacting each of the drive rollers and passing over a series of idler rollers 142 whereby each drive feed roller is positively driven at the same linear velocity by means of the drive belt. With the novel configuration of the drive belt, as shown in FIG. 3, the belt may be replaced if necessary by the removal of only one shaft 146 without necessitating the removal of the drive feed rollers 121.

The endless belt 141 is driven through a friction wheel 144 secured to a timing sprocket 145 rotatably mounted on a shaft 146 secured between front and rear frame plates 102 and 103, respectively, the timing sprocket being driven by an electric motor B-2.

The diverting mechanisms 130 which include a series of gates 131 secured to a gate shaft 132 are journaled for rotational movement in front and rear frame plates 102 and 103, respectively. The gates are formed with a concave portion 133 and a flat portion 134 and positioned on the gate shafts 132 within the undercut portion of the drive rollers adjacent to the path of paper movement when the gates are out of deflecting position. When the diverting mechanisms are actuated as hereinafter described, the shaft 132 is rotated to raise the flat portion out of the undercut of the drive feed rollers to bring the concave portion 133 of the gates into interference with the path of paper movement, thereby diverting the sheet material into a predetermined catch tray.

As the sheet material is forwarded by means of the drive feed rollers cooperating with idler rollers to be hereinafter described, the diverting mechanisms 130 are sequentially actuated to divert the sheet material into the appropriate catch tray by means of a cam break, each cam controlling the rotational movement of a single diverting mechanism for sequentially moving the gates into interference with the path of paper movement.

To complete a paper transport for delivering sheet material to the appropriate catch tray when one modular unit is placed in cooperative relation with another modular sheet distributor, an end plate 400 or a sheet distributor such as disclosed in copending application Ser. No. 574,990, filed Aug. 25, 1966 in the names of James E. Britt et al., there are provided a plurality of idler rollers 161 supported by right-hand frame plate 106. The idler rollers 161 are individually rotatably mounted on a bifurcated bracket 162 supported on tie rods 163, secured to an idler transport frame 165, and biased in a counter-clockwise direction, as seen in FIG. 3, to be held in pressure contact with the drive feed rollers 121 of another modular distributor placed in cooperative relation to form a unitary sheet distributing machine. The positioning of the idler transport 160 and, therefore, the idler rollers 161 is determined by brackets 166 secured to the transport and right-hand frame plate 106. An end plate 400 is provided to complete a sheet transport adjacent the terminal sheet distributor section. An idler transport such as idler transport 160 is supported on end plate 400 and positioned in cooperative relation with the drive feed rollers 121 and diverting mechanisms 130 of the terminal section in a manner as previously described in regard to idler transport 160. Suitable mechanical convertors such as bayonets are secured to end plate 400 to mechanically interlock with suitable receptacles of the type shown in FIG. 2, for securing the end plate to the terminal section to complete a unitary distributing machine.

A plurality of parallel guide rails 164 are secured to and positioned on the transport frame 165 such that when the sheet distributor module is placed in cooperative relation with another sheet distributor module, the path of sheet travel formed thereby will be adjacent the guide rails 164 between the idler rollers 161 and the drive feed rollers 121. With a pair of sheet distributor modules in such a cooperative relation, when a diverting mechanism 130 is actuated by a cam the flat portion 134 of the gate, normally parallel to the path of paper travel, is rotated into interference with the path of paper travel and into the guide rails 164 of the idler transport. The concave portion 133 of the gate will, therefore, be moved into interference with the path of paper travel to deflect the sheet material into the appropriate catch tray.

Figure 2:
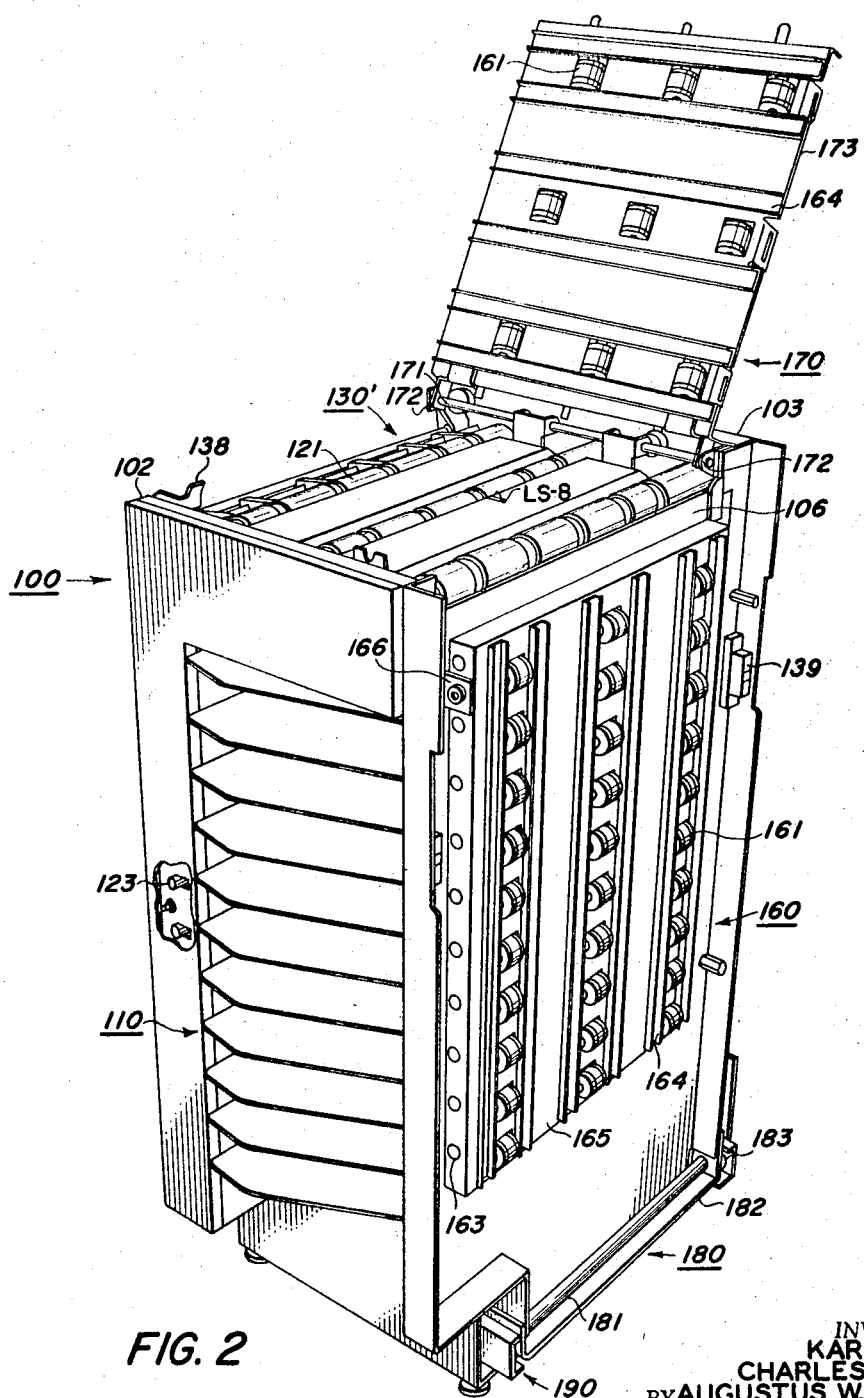
FIG. 2 is a front perspective view of an embodiment of the invention to illustrate the features thereof.

As seen in the drawings, sheet material passes across the top of the sorter module by means of a horizontal transport 170 and down adjacent left-hand frame plate 107 into the appropriate catch tray. To facilitate the removal of occasional sheet material jams, the horizontal transport 170 is supported at one side by pivot rod 171, mounted on the rear frame plate 103 by means of brackets 172 appropriately secured thereto, to enable the transport to be pivoted out of cooperative relationship with the drive feed rollers 121, as best shown in FIG. 2, thereby enabling sheet material jams to be cleared from this section of the sheet distributor module with extreme ease. The horizontal idler transport 170 is formed with a base plate 173 having parallel guide rails 164 secured thereto and positioned in cooperative relation with gates of a diverting mechanism 230 to perform the same function as heretofore described. A plurality of tie rods are secured in upturned portions of the transport frame and support a plurality of idler rollers 161. The bifurcated portion of the idler roller brackets 162 engage a tie rod 163 and are biased in a clockwise direction, as seen FIG. 5, through openings in the transport frame into engagement with the drive feed rollers 121, by means of a leaf spring 174 secured to the lower portion of the bifurcated brackets by means of an upturned lip with the other end of the leaf spring secured in a suitable slot provided in spring retaining brackets 175.

To facilitate the removal of the sheet material jams occasionally occurring in the vertical transport formed by cooperating modules, there is provided a dolly 180 secured to the front and rear frame plates 102 and 103 and right-hand frame plate 106 as by welding and to the left-hand frame plate 107 by means of a bracket thereby allowing the sheet distributor module to be readily movable. The dolly 180 is provided with three shafts 181 passing through upturned portions of the frame plate 182 and having roller wheels 183 journaled for rotation upon the ends of each of the three shafts. A trackway 190 having vertically adjustable leveler feet is provided to engage the rollers 183 of the dolly whereby the sheet distributor module may be moved into cooperative relation with another module to form a unitary sheet distributing machine or out of cooperative relationship for removal of sheet material jams occurring in the vertical transport formed by the cooperating modules.

While the invention has been described with reference to the structure disclosed herein, it is not to be confined to the details set forth in this application, but is intended to cover such modifications or changes as may come within the scope of the following claims.

What is claimed is:

1. Sheet transport apparatus adapted to facilitate the removal of sheet material jams occurring therein including:
   a plurality of rotatable drive rollers positioned in spaced relation to each other by a support member,
   a plurality of rotatable idler rollers,
   a frame member,
   bifurcated brackets mounted on said frame member and supporting said idler rollers in spaced relation to each other and positioning them in operative relationship with the drive rollers such that a path of sheet material travel is formed between said idler rollers and said drive rollers,
   spring means biasing said bifurcated brackets and idler rollers into position, said spring means having first ends engaging said bifurcated support brackets by means of a protruding lip, said spring means having second ends slidably engaging said frame member such that said springs may be slid out of contact with said frame member to disengage said bifurcated support brackets from said frame member for the removal of said idler rollers, and
   means connecting said frame member to said support member to move said idler rollers into and out from operative relationship with said drive rollers.

2. The apparatus of claim 1 wherein said frame member is pivotally connected to said support member.

3. The apparatus of claim 2 wherein said frame member is connected to one side of said support member parallel to the path of sheet material travel.

References Cited

UNITED STATES PATENTS

| | | | |
|---|---|---|---|
| 2,472,890 | 6/1949 | Ford | 271—64 |
| 2,569,692 | 10/1951 | Rockwell | 271—21 |

RICHARD E. AEGERTER, *Primary Examiner.*